Patented Sept. 27, 1949

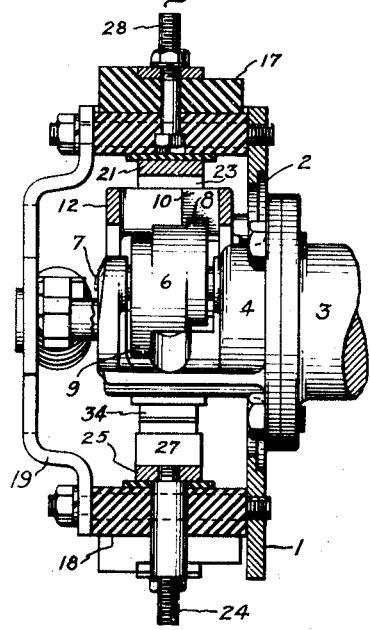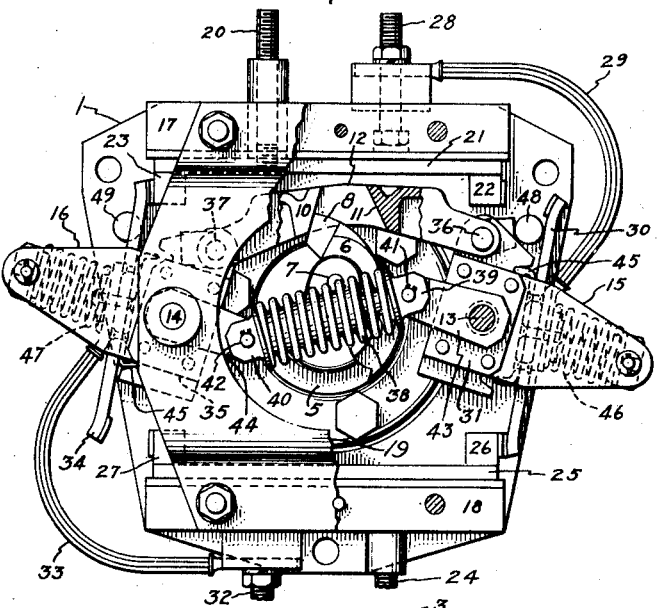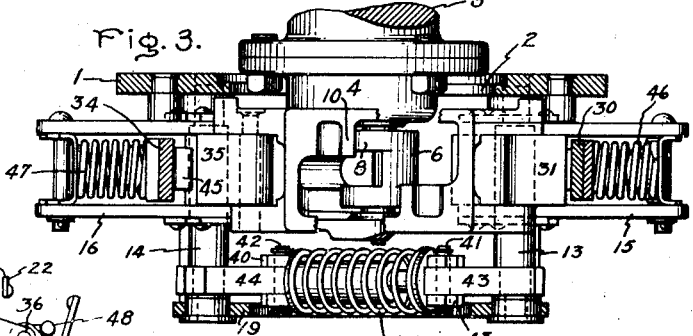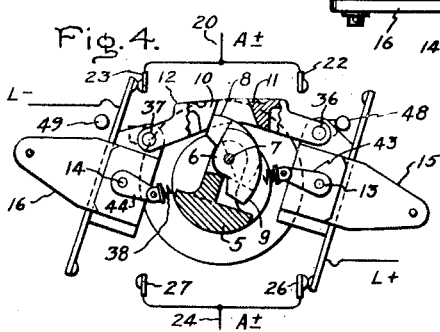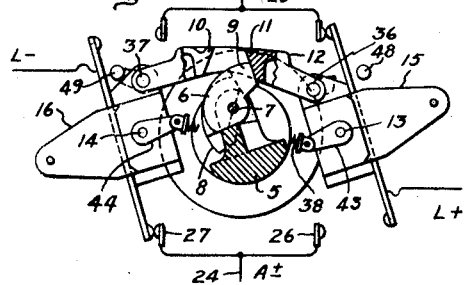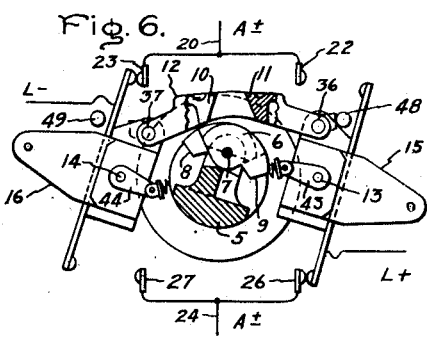
Inventor:
George W. Bower,
by Prowell S. Mack
His Attorney.

2,483,122

UNITED STATES PATENT OFFICE 2,483,122

CIRCUIT CONTROLLING DEVICE

George W. Bower, Harbor Creek, Pa., assignor to General Electric Company, a corporation of New York Application February 19, 1946, Serial No. 648,761

2 Claims. (Cl. 200—52)

My invention relates to a circuit controlling device, and more particularly to a reversing or pole changing switch for controlling an electric circuit in accordance with the direction of rotation of a rotatable member, and is particularly adapted to use on railway or other types of vehicles.

Various devices have heretofore been provided for changing or controlling an electric circuit in accordance with the direction of rotation of a rotating member such as a motor or generator armature so that the direction of current flow in the controlled circuit is maintained constant. Such systems are designed for battery charging applications on railway vehicles or for control of other portions of the electric distribution systems supplying direct current to motors and other devices where it is necessary that the current flow be maintained in a constant direction irrespective of the forward or reverse motion of the vehicle. In devices of this character it is desirable to provide a reversing switch that is positive in its action and functions automatically upon a reversal of vehicle motion, and is compact and rugged so that it may be mounted on or adjacent to the axle-driven generator and provide long periods of trouble-free operation. In addition, modern installations for battery charging on railway cars are frequently provided with a generator having a driving motor, usually of the induction motor type, capable of operating the generator through a releasable clutch when the car is standing still as in stations or terminals. The motor is connected to a source of power by a portable cable and thus the batteries may continue to be charged during periods when the car is idle. Since a conventional induction motor has relatively small torque on starting, it is necessary to provide a reversing switch on the generator which requires very little torque for its operation and which will operate during the first revolution of the generator as the initial acceleration of the induction motor is very high.

Accordingly, it is an object of my invention to provide an improved reversing switch that is compact, rugged and adapted for mounting on an axle-driven railway electric generator.

It is a further object of my invention to provide an improved circuit controlling device that is entirely automatic and positive in its circuit controlling function and adapted to control large values of electric current.

It is another object of my invention to provide an improved reversing switch for an axle-driven electric generator that is simple, embodies a minimum of moving parts, and requires a minimum of energy for its operation.

In carrying out my invention in a preferred form, I provide a simplified frame structure carrying two oscillating contact operating members spring-biased to either one of two selective positions, and arranged to be tripped or operated by a one-piece gravity-operated member, mounted on the end of the generator armature shaft, which therefore rotates with the generator armature in a direction corresponding to the motion of the vehicle. The one-piece gravity-functioning weight is located off-center of the generator shaft and, as will be described subsequently, is moved by gravity and by the force of inertia upon rotation of the armature to the proper position for engaging a contact actuating member to move this actuating member in a position for proper actuation of electric circuit controlling contacts.

For a more complete understanding of my invention, reference should now be had to the following description taken in connection with the accompanying drawing, and its scope will be pointed out in the appended claims. Fig. 1 is an end view, partially in section, of a reversing switch constructed in accordance with my invention; Fig. 2 is an elevational view of the device shown in Fig. 1, partially in section to show certain features of my invention, and Fig. 3 is a plan view of the device shown in Fig. 1, partially in section, showing certain constructional details of the reversing switch embodying my invention. Figs. 4, 5, and 6 are schematic representations of the operation of the reversing switch embodying my invention and showing more clearly the position of the gravity-operated member and the position of the circuit controlling contacts just prior to operation for a counterclockwise direction of rotation in Fig. 4, a clockwise direction of rotation in Fig. 5, and for operation at normal running speed in Fig. 6.

Referring now to the drawing, I have shown my invention as applied to a reversing switch comprising a supporting frame 1 adapted to be secured to the end member of a generator housing (not shown), and having an aperture 2 in alignment with the end of the armature shaft 3 through which the armature shaft extends. Mounted on the end of the armature shaft 3 is a carriage member 4 having a recessed portion designed for receiving the gravity-operated member 6 which is pivoted on a shaft 7 and arranged to one side of the center of the armature shaft 3. The carriage member 4 is provided with a weighted portion 5 for dynamically counter-balancing the mass of the gravity-operated member 6, thereby preventing any unbalance in the generator armature assembly. The gravity-operated member 6 has a pair of fingers 8 and 9 disposed in different vertical planes and adapted for engagement with the cooperating shoulders 10 and 11, respectively, of the contact-operating carriage 12. Disposed at either side of the armature shaft 3 and its extension 4 are pivots 13 and 14 which support the oscillating contact members 15 and 16, respectively. Mounted above and below the armature shaft 3 are two insulating members 17 and 18, respectively, which in addition to forming a support for the outer main frame 19 of the reversing switch also act as supporting members for the electrical stationary contact members of the switch. As shown in Fig. 2, at the top of the switch the electrical terminal 20 extends through the insulating member 17 and connects with the conducting strip 21 which supports the right-hand and left-hand stationary electrical contacts 22 and 23, respectively. A similar arrangement is provided at the bottom of the switch where it can be seen that the terminal 24 extends through the insulating member 18 and makes connection to the conducting strip 25 which supports at its right end and left end, respectively, the stationary electrical contacts 26 and 27. The other terminal 28 at the top of the switch is mounted on the insulating member 17 and electrically insulated from the conducting strip 21 and the remainder of the switch frame, but is electrically connected through the flexible connection 29 to the right-hand movable contact 30 which is carried on the right-hand oscillating switch member 31. At the lower portion of the switch, as shown in Fig. 2, a terminal 32 is provided which is mounted on the insulated member 18 but electrically insulated from the conducting strip 25 and the remainder of the switch frame. The terminal 32 is connected through the flexible connector 33 to the movable contact 34 which is mounted on the left-hand oscillating switch member 35. The right and left-hand oscillating switch members 31 and 35 are mounted for oscillating movement on the pivots 13 and 14 respectively, and are connected at their upper ends by means of the pivots 36 and 37 to the reciprocating carriage 12 for operation. Arranged to provide a toggle or snap action for providing positive operation for the oscillating members 31 and 35 in unison is a compression spring 38 which is disposed between the shoulders 39 and 40, exerting a pressure tending to force the shoulders 39 and 40 apart. The shoulders 39 and 40 are connected by means of pins 41 and 42 to the extension arms 43 and 44, respectively, of the oscillating switch members 31 and 35, respectively. Therefore, it can be seen that the compression spring 38, the operating arms 43 and 44 and the switch members 31 and 35 form a toggle or over-center spring mechanism which will positively hold the switch members 31 and 35 in either of two circuit controlling positions, corresponding to the extreme right or left position of the reciprocating carriage 12.

In order to provide adequate contact pressure and wipe in the engagement of the movable contact 30 with its stationary contacts 22 and 26, I have provided a flat U-shaped member 45 arranged to be biased firmly against notches in the outer surface of the switch member 31 by means of the compression spring 46. The movable contact 30 and the terminal of the flexible connector 29 are all connected to the flat U-shaped member 45 and held under compression by the spring 46, and from Fig. 2 it can be seen that as the switch member is thrown to a definite operating position there is an overtravel of the member 31 over that required to bring the movable contact member 30 in contact with the stationary contact 26. This provides a sufficient amount of wipe on the electrical contacts, thereby giving a positive electrical connection and also functioning to maintain the electrical contact surfaces clean and smooth. It should be noted that an identical arrangement for providing contact wipe is provided on the left-hand oscillating switch member 35, its movable contact 34, and biasing spring 47.

In connection with the operation of the toggle mechanism, it should be noted that the maximum travel of the carriage 12 is limited by the positive stops 48 and 49 at the extreme right and left positions, respectively, of its travel. The stops 48 and 49 provide a limitation on the amount of throw that can be exerted by the toggle mechanism and in addition, after the carriage 12 has been operated by the movable member 6, the toggle assembly will throw the carriage to a position of engagement with either one of the positive stops 48 or 49 and in so doing the position of the engaging shoulders 8 and 10, or 9 and 11, as the case may be, will then be out of operating relationship and there is no possibility of the finger of the movable member 6 striking the corresponding shoulder of the carriage 12 during the second or third or any subsequent turn of the armature.

The provision of the wiping contact arrangement as previously described is important with relation to the energy required to operate the switch. The springs 46 and 47 are selected so that their combined energy is slightly less than that of the main toggle mechanism spring 38. In other words, the energy of the toggle mechanism spring 38 is just sufficient to overcome the energy of the contact wipe springs 46 and 47 plus that necessary to position the carriage 12 firmly against its positive stop, either 48 or 49, as the case may be. This is important where the generator is being driven by an induction motor as might be the case where the railway car is idle in a terminal, yet it is necessary for the battery charging operation to continue. This arrangement reduces the amount of torque or energy required to operate the switch to that which can be developed in an induction motor upon starting without drawing excessive starting current. Another feature contributing to the ease of operation of my invention is the use of butt type contacts instead of a knife blade or other frictional engaging type of contact. The butt type contacts have the advantages of being easily replaceable, self-cleaning, self adjusting by means of the wipe springs to compensate for wear, and requiring no energy to effect their disengagement as is the case with contacts of the knife blade type.

The circuit controlling or reversing function of my invention will be understood from a reference to Figs. 4, 5 and 6, where I have shown the armature leads A± of the generator connected to the top and bottom terminals 20 and 24 respectively of the device. The output circuit leads, L+ and L—, are shown as connected to the switch terminals 28 and 32 respectively. It is customary to connect the generator shunt field permanently across the output or line leads L+ and L— which also supplies current to the battery for charging. Thus the polarities of L+ and L— are always constant, and it is necessary to reverse the polarity of the armature leads every time the direction of the armature rotation is reversed. This is accomplished by my device as shown in Figs. 5 and 6; for example, in Fig. 5 the circuit reversing contacts are in a position for counterclockwise rotation and such rotation produces positive armature polarity on the top terminal 20. Thus this terminal is connected to L+ through the contacts 22 and 30. If the direction of rotation is reversed to a clockwise direction as shown in Fig. 6, the polarity of the top terminal 20 is reversed to negative, however the switch position is now reversed and this terminal is connected to the negative line lead, L—, through the contacts 23 and 34; thus the line polarity is maintained constant at all times.

The operation of my invention is best understood by reference to Figs. 4 and 5. In Fig. 4, the device is schematically shown in a position of operation when the armature shaft of the generator has started to turn in a counterclockwise direction. Inasmuch as the gravity-operated member 6 has its center of gravity located outwardly of its pivot 7 with respect to the center of the armature shaft 3, it can be seen that as the armature shaft commences to turn in a counterclockwise direction the gravity-operated member will assume a position as shown in Fig. 4 due to the force of gravity and also due to the force of inertia acting upon the center of gravity of the member 6. With the member 6 in this position, the operating finger 8 of the member 6 is in engagement with the shoulder 10 of the reciprocating carriage 12 which is operatively connected with the oscillating switch members. As the armature shaft continues to rotate in a counterclockwise position, the carriage 12 will be thrown to the left, as viewed in Fig. 4, and, acting in conjunction with the toggle mechanism, will change the position of the movable contact members so that member 34 is in engagement with stationary contact 27 and movable contact 30 is in engagement with stationary contact 22. With the circuit controlling members in this position the circuit is so arranged, as previously described, that the direction of flow of the direct current output of the generator is in the proper direction for being supplied to the battery for charging or to any other motors or devices that require a constant directional flow of current.

Assume now that with the circuit controlling members in the position as last recited, that is for proper control during counterclockwise rotation of the generator armature, that the generator armature is brought to standstill. Now if the vehicle begins to move in an opposite direction from that just described, the operation of the reversing switch will be understood from a reference to Fig. 5. The circuit controlling members are still in their position of operation for counterclockwise rotation as described above, and the generator armature has commenced to turn in a clockwise direction. The action of the movable member 6 is reversed from the action as described above and as the assembly starts to turn in a clockwise direction the movable member 6 is forced by gravity and by inertia into a position as shown in Fig. 5. In this case the finger 9 is brought into engagement with the shoulder 11 of the switch operating carriage 12 and any further clockwise rotation of the armature assembly and movable member 6 will throw the carriage 12 toward the right, thus co-acting with the toggle switch mechanism to reverse the relative positions of the movable contact members 30 and 34 so that the contact member 30 is now in engagement with stationary contact 26, and the movable contact 34 is in engagement with the stationary contact 23. The position of the switch mechanism and the contact members after operation for clockwise rotation of the armature is as shown in Fig. 6.

Another advantage of my invention is clearly shown in Fig. 6 where it can be seen that the movable gravity-operated member 6 has attained a position whereby the operating fingers 8 and 9 are now spaced equidistantly from the center of the armature shaft 3. Fig. 6 shows the positions of the operating parts of my invention when the armature has reached its operating speed and the contact operating carriage has been thrown to the right as previously described in connection with Fig. 5. Due to the center of gravity of member 6 being disposed outwardly from its pivot 7, as the speed of the armature and its assembly 6 increases the center of gravity of the member 6 will be moved by centrifugal force to a position outermost from the center of the armature shaft 3. When the movable member has assumed the position shown in Fig. 6, the operating fingers 8 and 9 will be positioned so that the periphery described as they rotate will fall within the periphery of the shoulders 10 and 11 of the contact operating carriage 12 and there will be no engagement therewith or objectionable noise or clicking as the armature continues to rotate. The armature and its operating assembly will rotate freely within the switch once the reversing action has been accomplished and the armature has reached a higher speed operating level.

It is important to observe that there is no possibility of any objectionable clicking or possible damage to the mechanism by reason of the finger 8 striking the shoulder 11 of the carriage 12, as shown in Fig. 2, inasmuch as the shoulders that are designed for cooperation in one direction of rotation are placed in the same vertical plane, and those for the opposite direction of rotation are placed in a different or offset vertical plane. This may be clearly seen in the views of the device as shown in Fig. 1 and Fig. 3.

It should also be pointed out that while I have shown the oscillating switch members 31 and 35 together with their extension arms 43 and 44 as shown mounted on pivots 13 and 14, it is also feasible and very practical to provide these switch assemblies with knife-edge bearings as well as with cylindrical bearings, and in certain cases where a heavier construction of switch is desired to increase the current-carrying capacity thereof, the knife-edge type of bearing may be advisable.

From the foregoing description of the operation of my invention, it will be seen that I have provided an improved type of reversing switch which embodies a minimum of moving parts, is simple and rugged in its construction and provides positive and fool-proof operation to reverse the controlled electric circuit in accordance with the direction of rotation of the armature or motion of the vehicle to insure that the flow of current from the generator is always constant in one direction. My device is also compact and designed for mounting in relatively small and inaccessible locations where maintenance or adjustment would be of considerable difficulty.

While I have shown a particular embodiment of my invention it will be understood, of course, that I do not wish to be limited thereto since many modifications may be made and I, therefore, aim in the appended claims to cover all such modifications as fall within the true spirit and scope of my invention.

What I claim as new and desire to secure by Letters Patent of the United States is:

1. A reversing switch arranged for mounting on a railway generator said switch comprising a shaft extension for said generator, a rotatable member mounted on said shaft extension and arranged for rotation therewith, a one-piece gravity functioning weight pivoted on said rotatable member eccentrically with respect to the center of said shaft extension, said weight comprising an integrally formed pair of operating fingers arranged in offset operating planes and a mass adapted at high speeds of rotation of said shaft extension to move outward with respect to said shaft extension center thereby holding said fingers inward with respect to said center, an additional weight secured to said shaft extension and arranged to counterbalance said first-mentioned weight, a reciprocating carriage arranged above the assembly of said shaft extension, rotatable member and weights, said reciprocating carriage having a pair of shoulders each arranged for selective cooperation with one of said operating fingers, a pair of circuit controlling members arranged for positioning by said reciprocating carriage, and spring biasing means for positively positioning said circuit controlling means.

2. A reversing switch comprising a frame structure, two contact operating members pivotably mounted on opposite sides of said frame structure, means for spring biasing both of said contact operating members to one or the other of two selective positions, an operating carriage arranged for movement within said frame structure and adjacent the top thereof and adapted to contact one or the other of said contact operating members thereby to pivot both to one or to the other of said two selective positions, a rotatable member arranged within said frame structure and adapted to be connected to and rotated by a dynamoelectric machine shaft, a one-piece gravity-operated member pivotably connected to said rotatable member eccentrically with respect to the center of rotation of said rotatable member, said gravity-operated member comprising oppositely extending fingers and a weighted portion adapted to be positioned outwardly from said pivot with respect to the center of said shaft upon high speed rotation thereof thereby to draw said fingers inward with respect to said shaft center and said weighted portion being adapted to be positioned by gravity upon slow rotation of said shaft in one direction to cause one finger to actuate said operating carriage in one direction and upon the opposite direction of slow rotation to cause the other of said fingers to actuate said operating carriage in the opposite direction.

GEORGE W. BOWER.

REFERENCES CITED

The following references are of record in the file of this patent:

UNITED STATES PATENTS

| Number | Name | Date |
| --- | --- | --- |
| 2,109,987 | Bower | Mar. 1, 1938 |